Feb. 6, 1945. W. R. BREND 2,368,742
APPARATUS FOR APPLYING PLASTIC COATINGS
Filed June 25, 1941 3 Sheets-Sheet 1

INVENTOR
WILLIAM R. BREND
BY Cooper, Kerr & Dunham
ATTORNEYS

Feb. 6, 1945.   W. R. BREND   2,368,742
APPARATUS FOR APPLYING PLASTIC COATINGS
Filed June 25, 1941   3 Sheets-Sheet 2

INVENTOR
WILLIAM R. BREND
BY
ATTORNEYS

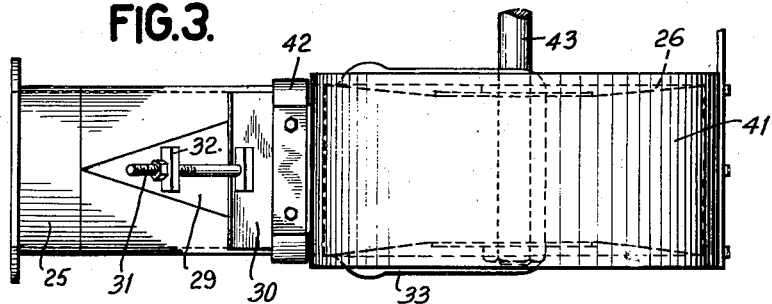
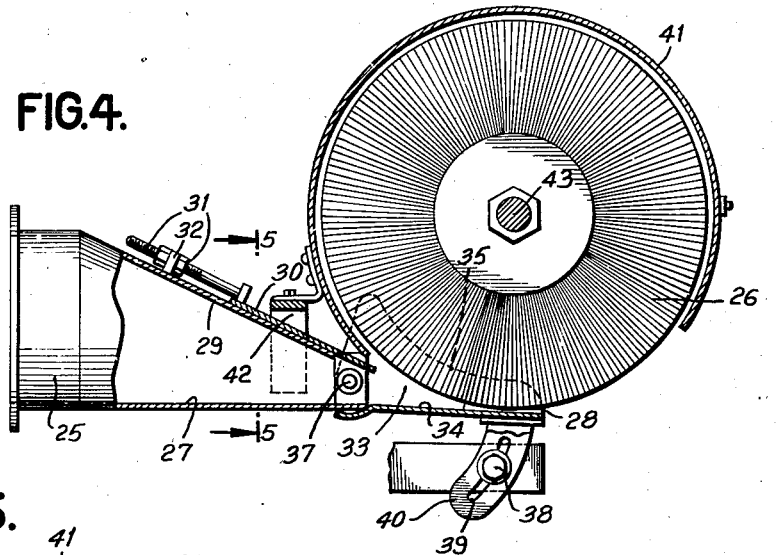
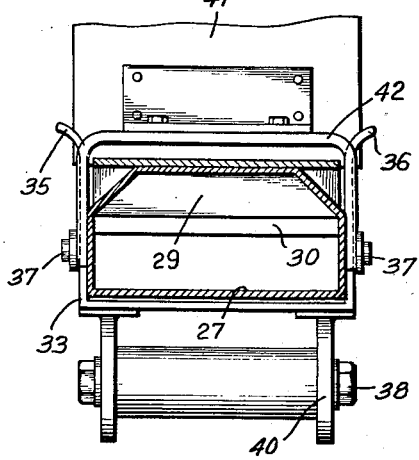
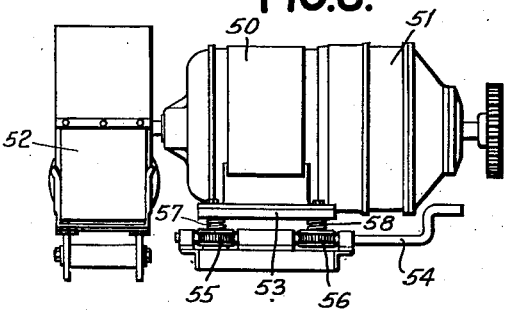

Patented Feb. 6, 1945

2,368,742

UNITED STATES PATENT OFFICE 2,368,742

APPARATUS FOR APPLYING PLASTIC COATINGS

William R. Brend, East Orange, N. J., assignor to Lock Joint Pipe Company, East Orange, N. J., a corporation of New Jersey Application June 25, 1941, Serial No. 399,616

6 Claims. (Cl. 91—44)

This invention relates to apparatus for applying coatings of plastic materials. Among the objects of the invention is to provide apparatus for applying a coating of plastic material, such as concrete, in such manner as to create a compact coating which will subsequently harden and form a coating possessing high density and commensurate strength and durability.

Another object of the invention is to provide apparatus capable of imparting a relatively high velocity to particles which make up a supply of plastic material and to project the said plastic material in a continuous stream against a surface which is to be coated.

Another object of the invention is to provide apparatus for advancing plastic material towards a discharge mouth or orifice and into contact with the periphery of a rotating element by which it is immediately picked up and directly projected from the discharge orifice.

Another object of the invention is to provide, in an apparatus for applying a coating of plastic material and having a rotary impelling element for projecting the material, a device for supplying the plastic material to the rotary impelling element and means for enabling adjustment between the impelling element and the material supplying device so as to control, in one instance, the quantity of material presented to the impelling element, and, in another instance, the size of the discharge opening through which the material is projected.

Another object of the invention is to provide a process and apparatus for applying plastic material to a pipe by which the material is applied in a densified strip which winds helically about the pipe, the densified strip is smoothened and further compacted immediately after its application and is confined within an enveloping sheet.

Further and other objects of the present invention will be set forth in the accompanying specification and claims and demonstrated by the drawings which show by way of illustration a preferred embodiment and the principle of my invention, and what I now consider the best mode in which I have contemplated applying that principle. Other embodiments of the invention employing the same principle may be used and structural changes made as desired by those skilled in the art, within the spirit of the appended claims and without departing from the present invention.

The apparatus and process of this invention is concerned with applying coatings of plastic materials and particularly materials which are plastic and moldable and which subsequently harden or set in a solid mass. The apparatus is particularly suitable for applying coatings of such plastic materials as contain solid matter or aggregate such as mixtures containing sand, or other concrete materials, mixed with cement. Efficacy of the process of the apparatus resides in its capability for applying concrete at a rapid rate and under conditions which produce a well-anchored and long-wearing coating. The apparatus projects a stream of concrete at a high velocity and builds a coating having great density.

While I have shown in the drawings a form of the invention embodied in an apparatus for applying a coating to the exterior of a pipe, it is to be understood that many of its aspects have utility for coating other types of walls. The apparatus is designed to project a stream of plastic material against the exterior of the pipe and relative motion between the apparatus and the pipe is provided so as to lay a helical winding or course of plastic material upon the pipe in such a manner as to form a continuous layer of material. In the embodiment of the invention illustrated in the drawings, the pipe is rotated as the applying apparatus is moved lengthwise of the pipe in a horizontal plane and it is readily understood that the motions described are relative and may be interchanged between the applying apparatus and the pipe.

In the drawings,

Fig. 3 is an enlarged view of the discharge end of the apparatus shown in plan.

Fig. 4 is a side view of the apparatus shown in Fig. 3.

Fig. 5 is a section on line 5—5 of Fig. 4, and

Fig. 6 illustrates the discharge end of an apparatus and means for adjusting the thickness of the flow of material therefrom.

Figure 1:
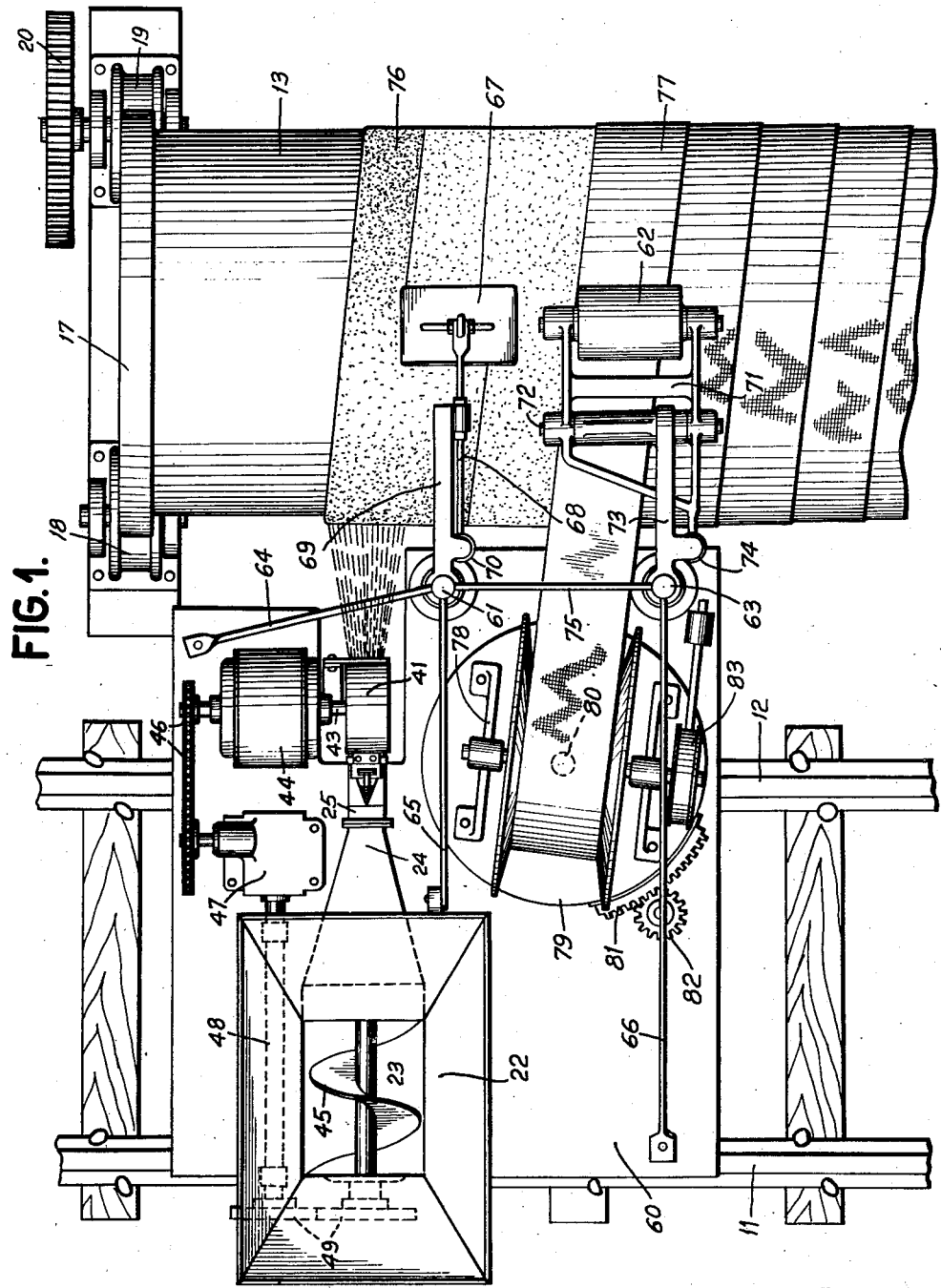
Fig. 1 shows a plan of the apparatus in operation.
Figure 2:
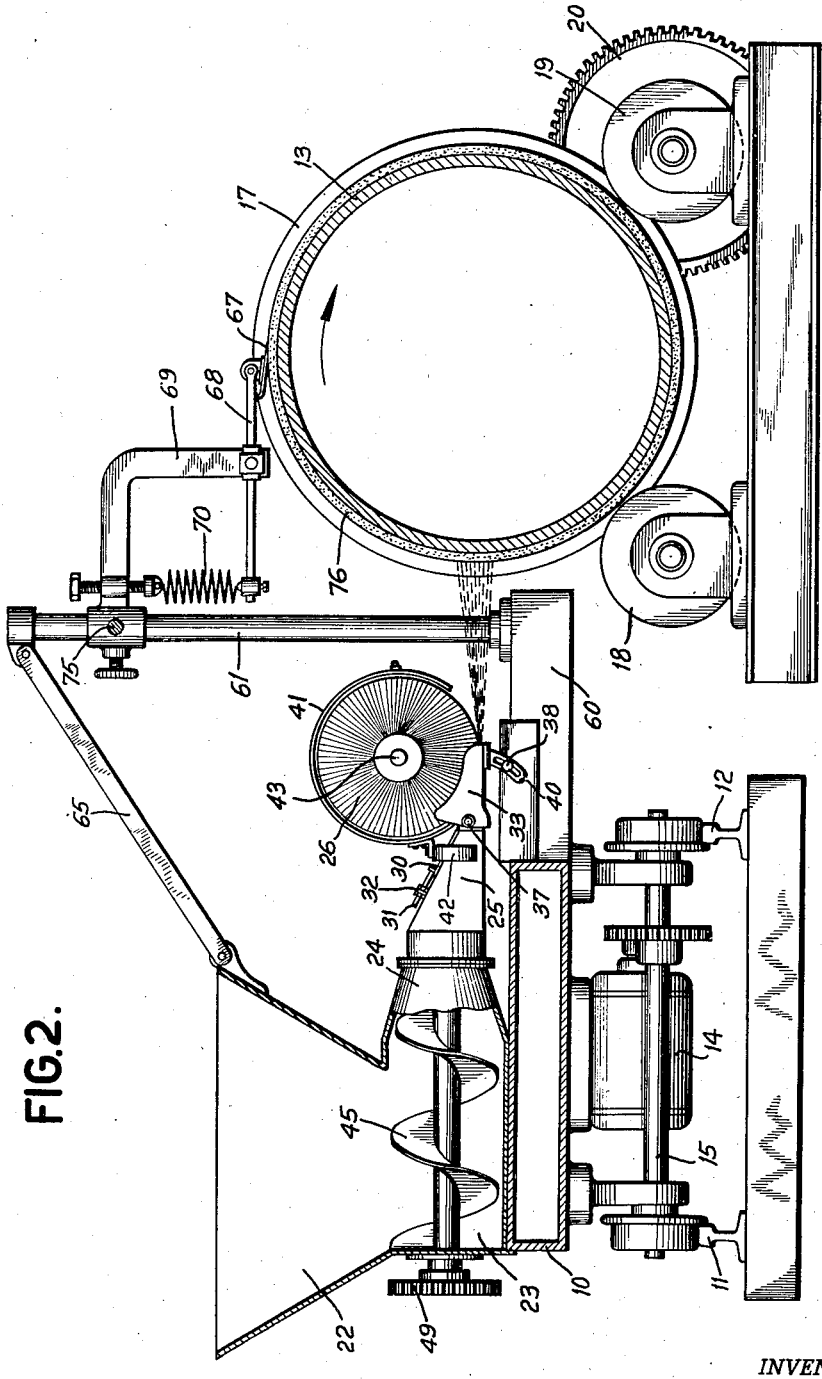
Fig. 2 is a side elevation of the apparatus of Fig. 1.

As illustrated in Figs 1 and 2, the applying apparatus is mounted upon a carriage 10 which is supported for travel upon rails 11, 12. These rails are arranged lengthwise of a pipe 13 which is to be coated. A motor 14 is geared to the axle 15 of the wheels for driving the carriage along the rails. For small undertakings, the carriage could be moved along the rails manually, but it is preferred to use motor power because of its facility for adjusting the rate of travel and uniform application of plastic material lengthwise of the pipe.

The pipe 13 has its ends secured in detachable trunnion rings 17 and these are in turn supported by a pair of trunnion rollers 18, 19, at each end of the pipe. The pipe is rotated at a selected uniform speed through gear 20.

The carriage supports a casing which comprises a hopper 22 and the tubular chamber 23 which are in open communication with each other. The tubular chamber includes the lower part of the hopper forming a trough and a conduit or conveying tube 24 which discharges into another conduit or spout 25. Conduit 25 is so formed and disposed as to direct plastic material to the periphery of a rotary impelling element 26 which picks up the material and projects it forcibly against the surface that is to be covered.

The discharge of plastic material from the rotary impelling element is in a direction substantially tangential to the periphery of the rotary element and the relationship of the rotary element and conduit 25 is such that the plastic material approaches the rotary element in a direction which is substantially coextensive with its direction of projection by the rotary element, Fig. 2. As shown in Figs. 4 and 5, particularly, it will be seen that this direction is in substantially the same plane as the lower surface 27 of conduit 25. The location of this surface relative to the point of its closest approach to the periphery of the rotary element 26 and the point of discharge 28 may be made adjustable. The width of the opening of conduit 25 at the place of closest approach of the conduit to the periphery of the rotary element is preferably the same as the width of the rotary element. With this arrangement the periphery of the rotary element cooperates to close off the opening of the conduit except for the discharge mouth or orifice.

For the rotary element 26, I employ a cylindrical brush preferably made of bristles consisting of metallic spring steel or other suitable spring material which is sufficiently tough to withstand attrition and at the same time provide sufficient resilience to impart high velocity to the particles of plastic material which are picked up and batted out through the discharge mouth 28. I have found that spring steel wire forms satisfactory bristles for use in an apparatus for applying coatings of cement or concrete.

As shown in Fig. 4, conduit 25 converges at its discharge end and presents an opening in the conduit which is opposite to the periphery of the brush proximate the point of discharge 28. In the embodiment of the invention illustrated this is brought about by sloping wall 29 with respect to wall 27, but this inclination of wall 29 is not indispensable.

In order to vary the size of the opening presented to the periphery of the brush, the length of arc extending from the edge of wall 29 to the discharge point or mouth 28 may be varied. Adjustment of this discharge opening may be accomplished by means of an adjustable gate 30 which operates as an extension of wall 29. The position of this gate may be toward or away from the mouth 28. The gate is locked in adjusted position by means of the screw 31 extending therefrom and nuts which engage a stationary lug 32 extending from wall 29. The area of the opening of conduit 25 opposite the periphery of the brush and hence the quantity of plastic material approaching the brush through said conduit may be determined by positioning gate 30 at will. With a rectangular conduit the area of the conduit opening is obtained by multiplying the width of the opening by the distance of the free edge of gate 30 from the point of tangency of the extension of wall 27 with respect to the periphery of the brush.

The extension of the wall 27 at the discharge end of the conduit includes a pivoted member 33 whereby the distance between the closest approach to the periphery of the brush and the bottom wall of the conduit may be adjusted for controlling the area of the stream of plastic cement which is projected from the conduit. This pivoted member is channel-shaped and has a bottom wall 34 and side walls 35, 36, which flank the sides of the brush. These three walls are in effect a continuation of three of the walls of conduit 25 and they, together with the brush, constitute a live extension of the conduit to the discharge mouth 28. The channel-shaped member is pivoted at 37 and its adjusted position is maintained by screw 38 which engages an arcuate slot 39 in a lug 40 which depends from the member.

The discharge mouth for the stream of plastic material is located approximately at the point of tangency of wall 34 of the adjustable member and the periphery of the brush. A desired nozzle effect may be obtained by regulating the size of the discharge mouth. As the brush wears, compensating adjustment may be made.

The plastic material approaching the brush through conduit 25 is fed or forced against the periphery of the brush by which it is struck and projected through the mouth 28 approximately as shown in Fig. 2. The brush is rotated at a high speed and imparts high velocity to the particles with the result that they impact upon the surface of the pipe and upon each other and thereby cause the formation of a dense coating. The action of the brush is continuously to scrape from the supply of plastic material which is forcibly presented to the periphery of the brush and transmit kinetic energy to the material. As a result of the progressive advance of the plastic material and the action of the bristles at the periphery of the brush the plastic material is finely divided and projected in a continuous stream.

A circular guard 41 is spaced from the periphery of the brush in such position as to prevent spattering of material and injury to anyone nearby. This guard is supported upon the apparatus by a bracket 42.

Brush 26 is mounted upon a shaft 43 which extends from a motor 44, Fig. 1, by which the brush is driven. This motor also transmits power to the screw 45 through chain and sprocket 46, gearing 47, shaft 48 and gearing 49. It is apparent from these connections that the rotations of the brush and the screw are synchronized with respect to each other.

The screw is mounted in the rounded portion at the bottom of the hopper 22 and serves to advance plastic material into conduit 25 and against the periphery of the rotary brush. Other material-advancing means may be employed, and the pressure of the material upon the brush may be effected by a gravity feed arrangement.

If desired, the motor for driving the brush may be provided with a variable speed unit. I have shown in Fig. 6 a variable speed unit 50 intermediate a motor 51 and a brush 52. The motor and variable speed unit are bolted to a platform 53 which is provided with elevating mechanism for changing the clearance between the periphery of the brush and the surface of the conduit which forms the discharge mouth. This elevating mechanism comprises a crank 54 having worms (not shown) in engagement with worm wheels 55, 56. These worm wheels are threaded interiorly and engage screws 57, 58, respectively, which are secured to the motor platform so that the motor may be raised or lowered, depending upon the direction of rotation of the crank. This motor and brush elevating mechanism may be used either in conjunction with the conduit and adjustable member 33, or it may be used in conjunction with a fixed conduit in which the portion opposite the brush or proximate the discharge mouth is stationary.

The apparatus has been found to be effective for applying coatings of such plastic materials as contain solid matter or aggregate such as mixtures containing sand and other concrete materials mixed with cement. Coatings of sand and aggregates, such as gravel and crushed stone, mixed with cement, and coatings of cement and asbestos are also effectively applied.

As shown in Figs. 1 and 2, the carriage includes a platform 60 upon which are mounted finishing and wrapping mechanisms. A trowelling device is supported from a standard 61 and a roller 62 is supported from a similar standard 63. Braces 64 and 65 extend to standard 61 and brace 66 extends to standard 63. The trowelling device or the roller can be used as a finishing mechanism directly against the surface of the plastic material or both of these can be used together to further consolidate the covering of plastic material. The roller has particular utility when the apparatus is used to apply concrete having a low water content.

The trowelling device includes a trowel 67 which is pivotally mounted upon a lever 68 carried by a bracket 69. The trowel is pressed towards the surface of the pipe by means of a spring 70 which is connected between the other end of the lever and the bracket 69.

Roller 62 is mounted upon a lever-frame 71 which is pivotally supported at 72 by means of a bracket 73. Bracket 73 is supported on standard 63. A spring 74 extends from lever-frame 71 to bracket 73. Tie-rod 75 connects brackets 69 and 73. The positions of both brackets can be changed upon their standards to accommodate different sizes of pipe.

As shown in the drawings, a trowelling device is so placed as to follow immediately the application of a course of plastic material 76. Thereafter the wrapping apparatus applies a wrapping 77 for holding the smoothened material in position upon the pipe to prevent its displacement before hardening. However, the wrapping material can be applied whether or not there has been any previous trowelling or rolling of the concrete surface.

The wrapping mechanism includes a spool holder 78, which is mounted upon a platform 79 arranged for rotation about a vertical axis 80. A gear sector 81 is secured to the platform and is engaged by a gear 82 for traversing the platform. The angularity of the axis of the spool with respect to the axis of the pipe is dependent upon the pitch which the wrapping is to have about the pipe. The spool contains a supply of wrapping material such as paper, cloth, fabric or mesh made of either cloth or metal, or combinations of these materials, in strip form. The strip is drawn from the spool and wrapped around the pipe as illustrated in Fig. 1. A suitable cloth wrapping will contract upon absorbing moisture from a concrete coating. The effect of this will be to form an envelope about the covered pipe which will exert contracting forces upon the coating and thus insure snug engagement of the coating to the pipe surface prior to hardening.

A friction brake 83 provides sufficient restraint upon the spool to exert desired tension in the wrapping material as it is drawn from the spool by the rotation of the pipe.

The use of a wrapping, particularly upon pipes of large sizes, is a decided advantage because of the large area of pipe surface covered. Also, a pipe can be immediately removed from the apparatus and transported to a storage space shortly after the concrete covering has been applied. The wrapping protects the soft concrete and prevents it from becoming displaced during handling.

The function of the roller is primarily to compact and densify the concrete. It is shown in the drawings as riding over the strip of material used to envelop the pipe, but it may be used directly against the concrete surface, and, if desired, it may be used as a finishing device in place of a trowel, in which case no trowelling mechanism need be provided. When used in conjunction with a trowel it will act to further densify the concrete. When used over a fabric covering it will serve also to indent the fabric covering within the concrete, and whatever the wrapping material is made of, the roller will serve to press the wrapping into close adhesion to the surface of the concrete and densify the concrete.

Regardless whether or not trowelling, rolling or wrapping mechanism is used, the product obtained is characterized by the density of its concrete coating. This is because of the effects produced by the manner in which the concrete is applied. The operation of the brush maintains a uniform and steady stream of concrete which is finely divided into minute particles uniformly distributed throughout the stream. This results from the manner in which the brush picks up the concrete from a constantly advancing supply of concrete coming into contact with its rotating surface. The relatively large number of bristles in the brush provide an indefinite number of surfaces whereby small particles of the concrete are picked up and formed into a continuous stream.

What is claimed is:

1. Apparatus for impelling material having the consistency of plastic concrete comprising a rotary brush having bristles presenting a periphery formed by the ends of the bristles, means for rotating said brush, a feed pipe having its discharge end opening directly against a portion of the periphery of said brush, said feed pipe having a wall ending short of the periphery of said brush at the side of the pipe opening adjacent the receding brush periphery so as to provide a discharge mouth between the wall end and the brush periphery, means for adjusting the clearance between said feed pipe wall and the brush periphery for controlling the thickness of the stream of plastic concrete issuing from said pipe under propulsion by said rotary brush, and means within said feed pipe for advancing the contents of said feed pipe into the zone of influence of the brush.

2. Apparatus for impelling material having the consistency of plastic concrete comprising a rotary brush having bristles presenting a periphery formed by the ends of the bristles, a feed pipe having its discharging end disposed to discharge tangentially to and directly against a portion of the periphery of said brush and providing clearance between its discharge end and the periphery of the brush for the projection of plastic concrete directly from the feed pipe and from the apparatus in a direction substantially coextensive to the direction of movement of the discharge of concrete from said feed pipe, mechanically operated means for advancing plastic concrete in said feed pipe and into contacting relationship with the periphery of said brush, and means for rotating said brush to cause it to pick up plastic concrete from within said feed pipe and to impel it in a continuous stream through said clearance and outwardly from the apparatus.

3. Apparatus for impelling material having the consistency of plastic concrete comprising a rotary brush having bristles presenting a periphery formed by the ends of the bristles, a feed pipe having its discharge end opening directly against a portion of the periphery of said brush, said feed pipe having a portion of one side extending along the periphery of said brush in the direction of rotation, said portion of the wall being spaced from said periphery to provide a discharge mouth for the discharge of plastic concrete, said portion of the pipe wall extending along the periphery of the brush being articulated for adjustment of the size of opening of said discharge mouth between the brush periphery to control the thickness of the stream of plastic material projected from the pipe by said rotary brush.

4. Apparatus for impelling material having the consistency of plastic concrete comprising a rotary brush having bristles presenting a periphery formed by the ends of the bristles, means for rotating said brush, a feed pipe having its discharge end opening directly against a portion of the periphery of said brush, gate means located at the side of said feed pipe on the approaching side of said brush, said gate means being adjustable for adjusting the size of the area of the periphery of said brush which forms a continuing wall of said feed pipe, and a discharge mouth formed by a clearance between the periphery of said brush and the wall of said pipe opposite the receding side of said brush, said last-named wall being adjustable with respect to the periphery of said brush for controlling the thickness of the stream of plastic concrete issuing from said pipe under propulsion by said rotary brush.

5. Apparatus for impelling material having the consistency of plastic concrete comprising a rotary brush having bristles presenting a periphery formed by the free ends of the bristles, a feed pipe for conveying plastic concrete to the periphery of said brush, said feed pipe having a discharge opening opposite a portion of the periphery of said rotary brush with a wall portion of the feed pipe at the side of said opening from which the brush recedes when rotating, said wall portion being spaced from the brush periphery and leaving a clearance for the discharge of plastic concrete from said feed pipe, means for rotating said rotary brush for causing the same to impel plastic concrete from said feed pipe and through the discharge mouth formed by said clearance, and means for adjusting the position of the brush with reference to said feed pipe for enabling variation of the clearance between the discharge wall of said feed pipe and the periphery of the brush.

6. Apparatus for impelling material having the consistency of plastic concrete comprising a rotary brush having bristles presenting a cylindrical periphery formed by the ends of the bristles, means including a feed pipe for delivering plastic concrete directly to said brush periphery, means mounting said feed pipe in respect to said brush in a direction tangentially to said periphery, the delivery end of said feed pipe opening so as to direct material against a portion of the periphery of the brush and having a wall opposite a point of tangency of the pipe with said periphery, said wall being spaced from the periphery to provide a clearance between the wall and the brush for the emission of plastic material from the feed pipe, and means for rotating said brush to cause it to pick up plastic material from within said feed pipe and impel it in a continuous stream from the apparatus through said clearance.

WILLIAM R. BREND.